(12) United States Patent
Xicola Serrano

(10) Patent No.: US 10,988,195 B2
(45) Date of Patent: Apr. 27, 2021

(54) METHOD FOR ASSEMBLING HEATING INTO VEHICLE SEATS AND HEATED VEHICLE SEAT

(71) Applicant: NAD, S.L., Mollet del Valles (ES)

(72) Inventor: Jaume Xicola Serrano, Mollet del Valles (ES)

(73) Assignee: NAD, S.L., Mollet del Valles (ES)

( * ) Notice: Subject to any disclaimer, the term of this patent is extended or adjusted under 35 U.S.C. 154(b) by 68 days.

(21) Appl. No.: 15/465,804

(22) Filed: Mar. 22, 2017

(65) Prior Publication Data

US 2017/0274951 A1 Sep. 28, 2017

(30) Foreign Application Priority Data

Mar. 22, 2016 (EP) .................................... 16382128

(51) Int. Cl.
| | |
|---|---|
| *B62J 1/28* | (2006.01) |
| *B62J 1/00* | (2006.01) |
| *B62J 33/00* | (2006.01) |
| *B60N 2/56* | (2006.01) |

(52) U.S. Cl.
CPC .............. *B62J 1/28* (2013.01); *B60N 2/5685* (2013.01); *B62J 1/00* (2013.01); *B62J 33/00* (2013.01)

(58) Field of Classification Search
CPC ..... B62J 1/28; B62J 1/00; B62J 33/00; B60N 2/5685
See application file for complete search history.

(56) References Cited

U.S. PATENT DOCUMENTS

| | | | | |
|---|---|---|---|---|
| 5,002,335 | A * | 3/1991 | Bengtsson | B60N 2/5685 297/180.12 |
| 7,823,967 | B2 * | 11/2010 | Parnis | B60N 2/5685 297/180.1 |
| 2006/0289421 | A1 * | 12/2006 | Axinte | A47C 4/52 219/217 |
| 2008/0142494 | A1 * | 6/2008 | Blake | B60N 2/5685 219/217 |
| 2009/0033130 | A1 * | 2/2009 | Marquette | A47C 7/74 297/180.15 |

(Continued)

FOREIGN PATENT DOCUMENTS

| | | |
|---|---|---|
| CN | 2 521 119 Y | 11/2002 |
| EP | 0 943 267 A1 | 9/1999 |

(Continued)

OTHER PUBLICATIONS

European Search Report issued by the European Patent Office dated Sep. 12, 2016 in connection with European Application No. EP 16 38 2128.

*Primary Examiner* — Philip F Gabler
(74) *Attorney, Agent, or Firm* — Gary J. Gershik; Cooper & Dunham LLP

(57) ABSTRACT

The seat comprises a padded body (2) and at least one heating element (4), and also at least one cavity (3) in said padded body (2), in the interior of which said at least one heating element (4) is arranged. The assembly method comprises the stages of forming at least one cavity (3) in said padded body (2); and arranging said at least one heating element (4) in the interior of said at least one cavity (3). It makes it possible to enhance the positioning accuracy of the heating elements and enables greater speed of execution.

11 Claims, 1 Drawing Sheet

(56) References Cited

U.S. PATENT DOCUMENTS

2015/0375657 A1* 12/2015 Braun ................... B60N 3/048
                                                                                            219/202
2018/0281640 A1* 10/2018 Tsurumi ............... B60N 2/5685

FOREIGN PATENT DOCUMENTS

| JP | 11 135242 A | 5/1999 |
| JP | 2011 189007 A | 9/2011 |
| WO | WO 13/084092 A1 | 6/2013 |

\* cited by examiner

METHOD FOR ASSEMBLING HEATING INTO VEHICLE SEATS AND HEATED VEHICLE SEAT

RELATED APPLICATIONS

This application claims priority of European Patent Application No. 163 82 128.3, filed Mar. 22, 2016, the entire contents of which are hereby incorporated by reference into this application.

DESCRIPTION

The present invention relates to a method for assembling heating into vehicle seats and a heated vehicle seat, particularly for motorcycles.

BACKGROUND OF THE INVENTION

There is a current need to heat some parts of a vehicle with which a driver is in contact, for example to enhance the comfort of the users of the vehicle by heating the vehicle seat, for example, a motorcycle.

Among the technical requirements that must be fulfilled in the manufacture of heated upholstery elements, for example, vehicle seats, one is the combination of the usual anatomic and soft structure of the seats with an adequate arrangement of the heating elements and electric components, which can be activated at the user's request.

The assembly of these heating elements in general is performed by adhering or gluing the heating elements to those parts of the seat that are not in direct contact with the user.

Current assembly procedures are not very practical and expensive, since they require simultaneous gluing and stretching of the support, increasing assembly times, limiting the possibility of positioning and raising overhead costs.

Additionally, currently known methods that involve the installation of a heating element support and gluing thereof to the padding modify the original softness of the filling and user comfort.

A heating device of this type is disclosed in documents WO2013084092A1 and EP 2 857 297 A1 by the same holder filing the present application.

Therefore, the objective of the present invention is to overcome the aforementioned drawbacks, in particular, to provide a fast method that is more versatile in the positioning of the heating elements and their thermal performance, and also cheaper, because it is more reliable and has less necessary assembly parts.

DESCRIPTION OF THE INVENTION

The method and seat of the invention resolve the aforementioned drawbacks, having other advantages that will be described below.

The heating assembly method in accordance with the present invention is executed in vehicle seats that comprise a padded body, said heating comprising at least one heating element, and the method is characterised in that it comprises the stages of:
  forming at least one cavity in said padded body; and
  arranging at least one heating element in the interior of said at least one cavity.
Preferably, the formation of said at least one cavity is executed by cutting said at least one cavity in the padded body.

If desired, said installation stage comprises a stage wherein an adhesive is arranged in the interior of said at least one cavity, for fixing said at least one heating element in its interior.

According to a second aspect, the present invention also relates to a vehicle seat that comprises a padded body and at least one heating element, and is characterised in that it comprises at least one cavity in said padded body, in the interior of which said at least one heating element is arranged.

Advantageously, said at least one cavity has a sinuous shape and a depth comprised between 3 and 20 millimetres.

If desired, said at least one cavity may comprise various heating elements arranged at different depths in its interior.

Additionally, advantageously, said at least one heating element is electrically powered in order to be connected to the vehicle battery.

In accordance with a preferred embodiment, said at least one heating element is fixed in the interior of said at least one cavity, for example, by means of adhesive.

With the method and the seat in accordance with the present invention, at least the following advantages are achieved:
  enhanced positioning accuracy of the heating elements and faster execution speed compared with the current methods for incorporating heating to a vehicle seat;
  enhanced versatility of shapes and arrangements that can be obtained, always maintaining a very limited total number of components and that allow prolonged use, with fast return on investment of the machinery required to execute the method.

BRIEF DESCRIPTION OF THE DRAWINGS

In order to make the foregoing more readily understandable, a set of drawings are attached wherein schematically, by way of illustration and not limitation, a practical case of embodiment is represented.

DESCRIPTION OF A PREFERRED EMBODIMENT

Figure 1:
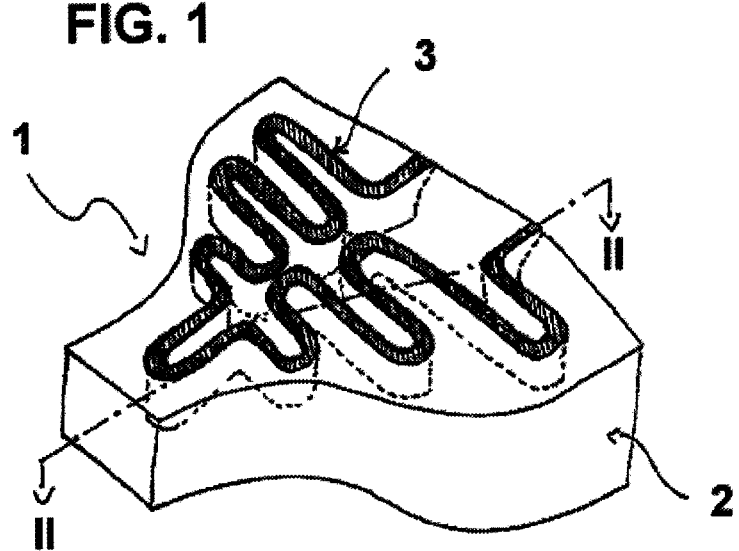
FIG. 1 shows a perspective view of a non-limiting embodiment of the seat in accordance with the present invention.
Figure 2:
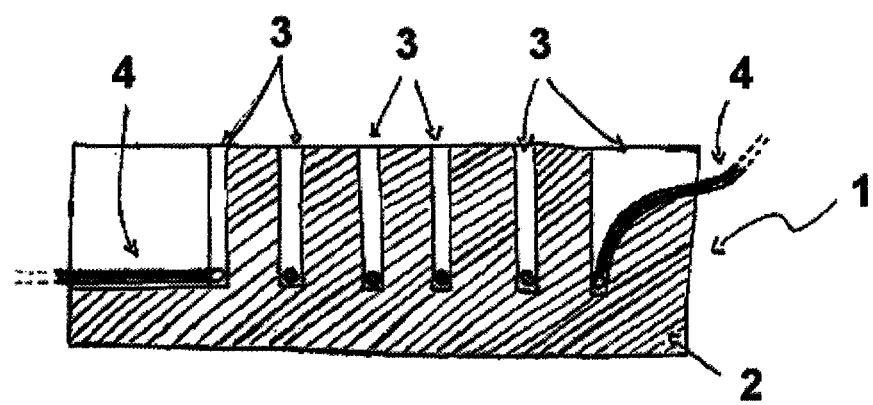
FIG. 2 shows a sectional view along line II-II of the seat of the present invention shown in FIG. 1.

The heated seat in accordance with the present invention is appropriate for use in any type of vehicle, particularly, but not exclusively, in a motorcycle or any other motorised vehicle. In seats with a backrest, said backrest can also be heated using the same system.

Said seat, identified in general with reference number 1, comprises a padded body 2 having one or more heating elements 4, which, in accordance with the present invention, are arranged in the interior of one or more cavities 3 made in said padded body 2.

In accordance with the embodiment represented, the seat comprises one single cavity 3 having a sinuous or undulating shape to encompass practically all the seat surface and achieve optimal heat diffusion. However, it should be noted that the seat may also comprise a plurality of cavities 3.

Said cavity 3 has an appropriate depth to arrange one or more heating elements 4, for example, a depth comprised between 3 and 20 mm, such that the heating element(s) 4 is/are housed in the interior of the cavity or cavities 3 in their entirety without projecting. In accordance with the embodiment disclosed herein, a heating element 4 is disposed in the cavity 3, for example, joined by means of adhesive (for example, silicone or polyurethane) or similar to the interior of the cavity 3.

The heating elements 4 may be any appropriate heating element, such as, for example, cables or wires wherethrough electric current flows, for connecting to the vehicle battery.

The method for assembling heating into vehicle seats in accordance with the present invention firstly comprises forming at least one cavity 3 in said padded body 2. The formation of the cavity or cavities 3 is executed using any appropriate means or technique, such as, for example, cutting the padded body.

As mentioned earlier, the cavity 3 must have sufficient depth to house one or more heating elements 4, for example, between 3 and 20 mm.

Once said at least one cavity 3 has been formed, at least one heating element 4 is arranged in the interior thereof.

After arranging the heating element 4, an adhesive, for example, silicone or polyurethane, can be arranged at the bottom or on the cavity walls 3 to join the heating element 4 in the interior of the cavity 3, preventing it from moving accidentally.

Despite the fact that reference has been made to a specific embodiment of the invention, it is evident for the person skilled in the art that the seat and method described are susceptible of many variations and modifications, and that all the aforementioned details may be replaced with other, technically equivalent ones without detracting from the scope of protection defined by the attached claims.

The invention claimed is:

1. A method for assembling heating into vehicle seats, wherein the seat comprises a padded body (2) having an upper surface and a lower surface opposite the upper surface and said heating comprising at least one elongated heating element (4), wherein the method comprises:
    (a) forming at least one cavity (3) in said padded body (2), said at least one cavity being a groove that has a sinuous or undulating shape and that is dimensioned to receive said at least one elongated heating element; and
    (b) arranging said at least one elongated heating element (4) in the interior of said groove and entirely below the upper surface of the padded body (2) from which said at least one cavity (3) extends towards the lower surface of the padded body (2), said at least one elongated heating element arranged in the groove to extend longitudinally along an entire length of the sinuous or undulating shaped groove (i) to cover a majority of the upper surface of the padded body and (i) to provide heat diffusion to a seat surface.

2. The method for assembling heating into vehicle seats, according to claim 1, wherein the formation in (a) of said at least one cavity (3) is executed by cutting said at least one cavity (3) in a groove shape into the padded body (2).

3. The method according to claim 2, wherein said at least one cavity (3) is a groove cut to a depth comprised between 3 and 20 millimeters.

4. The method for assembling heating into vehicle seats, according to claim 1, wherein said arranging in (b) further comprises arranging an adhesive in the interior of said at least one groove shaped cavity (3), for fixing said at least one elongated heating element (4) in the interior of said at least one groove shaped cavity (3).

5. The method according to claim 4, wherein said at least one elongated heating element (4) is a cable or a wire wherethrough electric current flows.

6. A heated vehicle seat comprising:
    a padded body (2) having an upper surface and a lower surface opposite the upper surface; and at least one elongated heating element (4), wherein at least one cavity (3) is provided in said padded body (2), said at least one cavity being a groove that has a sinuous or undulating shape and that is dimensioned to receive said at least one elongated heating element, said at least one elongated heating element (4) being arranged in the interior of said at least one cavity (3) and entirely below the upper surface of the padded body (2) and from which said at least one cavity (3) extends towards the lower surface of the padded body (2), and said at least one elongated heating element arranged in the groove to extend longitudinally along an entire length of the sinuous or undulating shaped groove (i) to cover a majority of the upper surface of the padded body and (i) to provide heat diffusion to a seat surface.

7. The vehicle seat, according to claim 6, wherein said groove has a depth comprised between 3 and 20 millimeters.

8. The vehicle seat, according to claim 6, wherein said groove comprises various elongated heating elements (4) arranged at different depths in its interior.

9. The vehicle seat, according to claim 8, wherein said at least one elongated heating element (4) is electrically powered.

10. The vehicle seat, according to claim 9, wherein said at least one elongated heating element (4) is fixed in the interior of said at least one cavity (3).

11. The vehicle seat, according to claim 10, wherein said at least one elongated heating element (4) is a cable or a wire wherethrough electric current flows.

* * * * *